3,455,806
CATAPHORETIC DEPOSITION OF NITROGEN
BASIC COPOLYMERS
Herbert Spoor, Mutterstadt, Pfalz, Gerhard Florus, Ludwigshafen (Rhine), and Heinz Pohlemann and Friedrich Schauder, Limburgerhof, Pfalz, Germany, assignors to Badische Anilin- & Soda-Fabrik Aktiengesellschaft, Ludwigshafen (Rhine), Germany
No Drawing. Filed Feb. 21, 1966, Ser. No. 528,765
Claims priority, application Germany, Feb. 27, 1965, B 80,753
Int. Cl. C23b *13/00;* B01k *5/02*
U.S. Cl. 204—181                                                    9 Claims

ABSTRACT OF THE DISCLOSURE

A process for producing coatings on substrates capable of conducting electricity by the electrochemical deposition by cataphoresis from aqueous solutions or aqueous dispersions of salts of a copolymer derived from (1) 3 to 30% by weight of aminoalkyl acrylates and/or methacrylates;
(2) 3 to 30% by weight of N-unsubstituted amides and/or N-alkylamides and/or N-hydroxyalkylamides and/or N-oxaalkylamides of acrylic and/or methacrylic acid;
(3) 40 to 94% by weight of alkyl esters of acrylic acid and/or methacrylic acid having one to eight carbon atoms in the alkyl radical and/or styrene and/or alkyl vinylbenzenes having one to three carbon atoms in the alkyl radical;
(4) 0 to 30% by weight of other copolymerizable ethylenically unsaturated monomers.

It was found that a highly advantageous coating could be produced in this manner which exhibited desirable adherence, hardness, elasticity and durability characteristics.

---

The present invention relates to a method of producing coatings, particularly baking lacquer coatings, on electrically conducting substrates, particularly metal substrates, in which from aqueous solutions or aqueous dispersions of salts of nitrogen basic cationic polymers, the polymers are electrochemically deposited on the substrates in the form of coatings by cataphoresis and then, in the case of baking lacquer coatings, baked. This method is hereinafter called cataphoresis method.

It is known that coatings, particularly baking lacquer coatings, may be prepared on electrically conducting substrates, particularly metal substrates, by electrochemically depositing the polymers on the substrates by means of anaphoresis from aqueous solutions or aqueous dispersions of salts of carboxylic polymers, followed, in the case of baking lacquer coatings, by baking. This method will hereinafter be referred to as anaphoresis method. A peculiarity of the anaphoresis method is that not only are the polymers deposited on the substrates (the anode), but also nascent oxygen is developed at the substrates and (when the articles consist of base metals) metal ions may pass into solution. The two last-mentioned phenomena are often disadvantageous because nascent oxygen may react with the polymers in an undesirable manner and metal ions may decrease the waterproofness of the coatings and discolor them (the latter occurring particularly in the case of substrates of copper or copper alloys).

On the other hand it is a peculiarity of the cataphoresis method that although the polymers are deposited on the substrate (cathode) in this case, too, hydrogen develops at the substrates and no metal ions pass into solution, even when the substrates consist of base metals. Since hydrogen in general hardly reacts with the polymers in an undesirable manner, the preparation of coatings by cataphoresis has, in this respect, advantages over the preparation of coatings by anaphoresis. It has however not hitherto been possible to develop salts of nitrogen basic cationic polymers from whose aqueous solutions or aqueous dispersions the polymers may not only be deposited by cataphoresis but will give coatings which have to a great extent the properties desired in coatings, such as strength of bond to the substrate, hardness, elasticity, and resistance to water and solvents.

The object of the present invention is to provide a cataphoresis method of the type defined above with which it is possible to prepare coatings which have most of the properties desired in coatings, such as good bond strength, good hardness, good elasticity and good resistance to water and solvents.

We have now found that the said object can be achieved by a cataphoresis method of the type defined above wherein the aqueous solution or aqueous dispersion of a salt of nitrogen basic copolymers are used, which copolymers are derived from (1) 3 to 30%, preferably 5 to 20%, by weight of aminoalkyl esters of acrylic acid and/or methacrylic acid;
(2) 3 to 30%, preferably 5 to 30%, by weight of amides, N-alkylamides, N-hydroxyalkylamides and/or N-oxaalkylamides of acrylic acid and/or methacrylic acid;
(3) 40 to 94%, preferably 50 to 90%, by weight of alkyl esters of acrylic acid and/or methacrylic acid and/or styrene and/or alkylvinylbenzenes;

and optionally also (4) not more than 30%, preferably not more than 20%, by weight of other copolymerizable ethylenically unsaturated monomers.

The following may be said regarding the components which go to make up the copolymers to be used in accordance with this invention:

(1) Examples of suitable aminoalkyl esters of acrylic and/or methacrylic acid are the aminoalkyl esters having one to six carbon atoms in the alkyl radical, such as the aminomethyl, aminopropyl and aminohexyl ester. Symmetrical and asymmetrical mono-(N,N-di-($C_1$-$C_4$-alkyl)amino)-($C_1$-$C_6$-alkyl) esters, such as mono-(N,N-dimethylamino)-ethyl ester, mono-(N,N-dibutylamino)-ethyl ester and mono-(N,N-dimethylamino)-hexyl ester are praticularly suitable.

(2) Suitable amides are acrylamide and methacrylamide; examples of suitable N-alkylamides are N-($C_1$-$C_4$-alkyl)amides, such as N-methylamide and N-butylamide; an example of suitable N-hydroxyalkylamides is N-hydroxymethylamide; suitable N-oxaalkylamides are particularly the N-2-oxaalkylamides having a total of two to five carbon atoms in the oxaalkyl radical, such as N-2-oxapropylamide and N-2-oxahexylamide. N-2-oxahexylamides are particularly suitable.

(3) Examples of suitable alkyl esters of acrylic acid and/or methacrylic acid are the esters having one to eight carbon atoms in the alkyl radical. Examples of preferred esters are the methyl, ethyl, n-propyl, isopropyl, n-butyl, isobutyl, tertiary-butyl and 2-ethylhexyl esters of acrylic acid and methacrylic acid.

Suitable alkylvinylbenzenes are the α-alkylstyrenes, o-alkylstyrenes, m-alkylstyrenes and/or p-alkylstyrenes having one to three, particularly one, carbon atoms in the alkyl radical.

(4) Examples of very suitable other comonomers are monohydroxyalkyl esters of acrylic and/or methacrylic acid having two to six carbon atoms in the alkylene radical, such as the 2-hydroxyethyl ester, 2-hydroxypropyl ester and 4-hydroxybutyl ester, and also for example vinyl esters of aliphatic monocarboxylic acids having one to five carbon atoms, the nitriles of acrylic and/or methacrylic acid and salts of symmetrical and asymmetrical mono - (N,N,N - tri-$C_1$–$C_4$-alkylammonium)-$C_1$–$C_6$-alkyl esters of acrylic and/or methacrylic acid.

In general it has proved to be advantageous for the copolymers to have K-values of 12 to 40 (as determined by the method of H. Fikentscher, Cellulosechemie 13 (1932), 12–25).

Preparation of the copolymers may be carried out by conventional methods; it is not the subject of the present invention. It has proved to be advantageous to prepare the copolymers by solution polymerization in organic solvents which may contain small amounts (up to about 10%) of water. Those solvents or mixtures of solvents which have a solubility in water of at least 30 g./l. are particularly suitable as solvents. Such solvents or mixtures of solvents need not be removed or need only be partly removed (for example by distillation) in the production of the aqueous solutions or aqueous dispersions. Examples of suitable solvents are methanol, ethanol, propanol, isopropanol, butanol, isobutanol, acetone, dioxane and tetrahydrofuran; examples of suitable mixtures are butanol and xylene; propanol and toluene; and dioxane and amyl acetate. Suitable methods for the production of the copolymers by solution polymerization are for example described in Houben-Weyl, "Methoden der organischen Chemie," volume XIV/1, pages 1,044 to 1,047 (section γ) and pages 744 to 782 (section ββ).

Production of the salts of the copolymers may also be carried out by conventional methods; it is not the subject of the present invention. The salts may be prepared for example by bringing acids or substances which react like acids into contact with copolymer. It is also possible however to bring the acid component into contact with the components of the copolymer prior to or during the copolymerization. Examples of suitable acids or substances which react like acids are hydrochloric acid, sulfuric acid, phosphoric acid, acetic acid, maleic anhydride and formic acid.

Production of the aqueous solutions or aqueous dispersions of the salts of the copolymers may also be prepared by conventional methods; it is not the subject of the present invention. For example one suitable method consists in preparing dispersions from water and from solutions of the copolymers in organic solvents, and then adding to the dispersions obtained the acid components. Another suitable method consists for example in introducing the salts of the copolymers as such or in the form of their solutions in organic solvents into water. In general it is advantageous to select such operating conditions that the total amount of the salt is present in the form of an aqueous solution or that the greater part of the salt is present as an aqueous solution and the lesser part in the form of a dispersion. Furthermore it is generally advantageous for the pH value of the solutions or dispersions to be adjusted to 1 to 8, preferably 3 to 6. This is generally the case when 0.2 to 1.5 acid equivalents of the acid component are present per base equivalent of the aminoalkyl ester component of the copolymer. Finally it is advantageous for the solutions or dispersions to be so made up prior to use that they contain a total of 3 to 20% by weight of the salt.

The aqueous solutions or aqueous dispersions of the salts of the copolymers may also contain other water-soluble or water-dispersible binders capable of being deposited electrochemically with the salts by means of cataphoresis. Examples of suitable binders of this type are aminoplast condensates, phenoplast condensates, expoxide resins, alkyd resins or mixtures of such binders. In general, the amount by weight of these additional other binders should advantageously not be larger than the amount by weight of the salt of the copolymer and usually is from 10 to 70% of the weight (dry) of the polymer salts. The solutions or dispersions may also contain, in admixture with the salts, auxiliaries which are capable of being deposited electrochemically by cataphoresis, such as pigments, cure catalysts and agents for improving flow.

Production of coatings from the aqueous solutions or aqueous dispersions on electrically conducting substrates, particularly metal substrates, is effected by means of cataphoresis by electrochemical deposition followed, in the case of baking lacquer coatings, by baking. Here again conventional methods may be used; the substrate is introduced into the solution or dispersion and made the cathode; another electrically conducting medium is also brought into contact with the solution or dispersion and made the anode. Since it is usually an advantage if no ions pass from the anode into the solution or dispersion being used for coating, it is in general recommendable to use an anode of an appropriate material, such as carbon or precious metal, or to separate the anode chamber by a diaphragm from the solution or dispersion. Coating itself may advantageously be carried out by means of a D.C. current of 2 to 300, preferably 20 to 150, volts; the temperature in the bath may advantageously be 10° to 50° C., preferably 20° to 40° C. The period of coating is in general about 0.5 to 3 minutes. After the coating has been applied, the coated substrates are removed from the solutions or dispersions, advantageously rinsed with water and may advantageously be kept for 5 to 180, preferably 20 to 60, minutes at temperatures of 80° to 250° C., preferably 120° to 170° C., for baking.

The method according to this invention is especially suitable for the production of baked coatings on metal articles and it is a particular advantage that not only substrates of iron and iron alloys, such as parts of car bodies, may be provided with high grade coatings, but also articles of copper or copper alloys. The process is moreover suitable for the production of coatings on other electrically conducting substrates, such as metallized plastics and graphitized textile fabrics.

The invention is further illustrated by the following examples in which parts and percentages are by weight.

EXAMPLE 1

0.5 mole of acetic acid per mole of mono-(N,N-dimethylamino)-ethyl ester units in the copolymer is added to a solution of a copolymer prepared by a conventional method of solution polymerization from 10 parts of mono-(N,N-dimethylamino)-ethyl methacrylate (1), 25 parts of the N-2-oxa-4-methylpentylamide of methacrylic acid (2), 35 parts of n-butyl acrylate (3a) and 30 parts of tertiary-butyl acrylate (3b) in 100 parts of a mixture of equal parts of n-butanol and p-xylene, and the whole is diluted with water to a solids content of 8%. The solution of the salt of the copolymer thus formed has a pH valve of 4.5.

A deep drawn steel sheet is dipped into the solution and made the cathode (the antipole being the vessel of alloyed steel which holds the solution) and a coating is deposited on the sheet steel during the course of one minute by means of a D.C. current of 50 volts. The sheet is rinsed with water and baked for twenty minutes at 170° C. It then has the following characteristics: thickness of layer, 34 microns; Erichsen elasticity, more than 10; pendulum hardness, 83"; waterproofness, no recognizable attack by water after 24 hours.

By following the above procedure while using a clean brass sheet instead of the steel sheet, a clear coating is obtained through which the color of the brass may be seen unchanged.

EXAMPLE 2

A solution of a copolymer prepared by a conventional method of solution polymerization from 10 parts of mono-(N,N-dimethylamino) - ethyl methacrylate (1), 5 parts of acrylamide (2), 40 parts of n-butyl acrylate (3a), 35 parts of tertiary-butyl acrylate (3b) and 10 parts of 4-hydroxybutyl acrylate (4) in 100 parts of a mixture of equal parts of n-butanol and p-xylene has added to it 0.91 mole of acetic acid per mole of mono-(N,N-dimethylamino)-ethyl methacrylate units of the copolymer and the mixture is mixed in the ratio of solids of 80:20 with a water-soluble melamine formaldehyde resin conventionally used in baking lacquers. The mixture is adjusted with water to a viscosity suitable for pigmentation, 13 parts of titanium dioxide pigment is added, the whole is homogenized in a ball mill and then diluted with more water to a total solids content of 8%.

A deep drawn steel sheet is dipped as cathode into this formulation and provided with a coating during one minute by means of a D.C. current of 50 volts; the coating is then baked for twenty minutes at 170° C. The coating is waterproof and does not yellow.

EXAMPLE 3

The procedure of Example 2 is followed but a completely water-soluble phenol-formaldehyde resin conventionally used in baking lacquers (molar ratio of phenol to formaldehyde about 1:2) is employed instead of the melamine-formaldehyde resin, and a solids ratio of 70:30 is used instead of the solids ratio of 80:20.

A hard, waterproof coating is obtained; it is considerably less discolored than a comparable coating obtained by means of anaphoresis from a coating agent containing phenol-formaldehyde resin.

EXAMPLE 4

A solution of a copolymer prepared by a conventional method of solution polymerization from 20 parts of γ-(N,N-diethylamino)-propyl acrylate (1), 15 parts of 2-oxa-propylacylamide (2), 25 parts of 2-ethylhexyl methacrylate (3a), 15 parts of styrene (3b), 15 parts of p-vinyltoluene (3c) and 10 parts of acrylonitrile in a mixture of n-butanol and p-xylene has added to it 0.95 mole of acetic acid per mole or γ-(N,N-diethylamino)-propyl acrylate units in the copolymer. Water is added until a viscosity suitable for pigmentation is obtained and then titanium dioxide is added. The mixture is homogenized and diluted with water to a solids content of 9%.

A steel sheet is dipped as cathode into this formulation and provided with a coating during about one minute. The coating is baked for 25 minutes at 180° C. The resulting coating is hard and waterproof.

We claim:
1. In a process for the production of coatings on electrically conducting substrates by electrochemical deposition by cataphoresis from aqueous solutions or aqueous dispersions of salts of polymers the improvement which comprises using the salts of copolymers derived from
   (1) 3 to 30% by weight of aminoalkyl acrylates and/or methacrylates;
   (2) 3 to 30% by weight of N-unsubstituted amides and/or N-alkylamides and/or N-hydroxyalkylamides and/or N-oxaalkylamides of acrylic and/or methacrylic acid;
   (3) 40 to 95% by weight of alkyl esters of acrylic acid and/or methacrylic acid having one to eight carbon atoms in the alkyl radical and/or styrene and/or alkyl vinylbenzenes having one to three carbon atoms in the alkyl radical;
   (4) 0 to 30% by weight of other copolymerizable ethylenically unsaturated monomers.

2. An improvement as claimed in claim 1 wherein the amount of aminoalkyl acrylates and/or methacrylates is 5 to 20% by weight.

3. An improvement as claimed in claim 1 wherein hydroxyalkyl esters of acrylic acid and/or methacrylic acid having two to six carbon atoms in the alkylene radical and/or vinyl esters of aliphatic monocarboxylic acids having one to five carbon atoms and/or acrylonitrile and/or methacrylonitrile are used as other copolymerizable ethylenically unsaturated monomers.

4. An improvement as claimed in claim 1 wherein the aqueous solution or aqueous dispersion of the salts of the copolymers have a pH value of 1 to 8.

5. An improvement as claimed in claim 1 wherein the aqueous solution or aqueous dispersion of the salts of the copolymers have a pH value of 3 to 6.

6. An improvement as claimed in claim 1 wherein the copolymer used has a K-value of 12 to 40.

7. An improvement as claimed in claim 1 wherein other water-soluble or water-dispersible binders capable of being deposited electrochemically with the polymer salts by means of cataphoresis are added in an amount of 10 to 70% of the weight of the polymer salts used.

8. An improvement as claimed in claim 1 wherein the deposited coatings are baked at temperatures of 80° to 250° C.

9. Electrically conducting articles having coatings which have been produced by electrochemical deposition by cataphoresis from aqueous solutions or aqueous dispersions of salts of copolymers from
   (1) 3 to 30% by weight of aminoalkyl acrylate and/or methacrylates;
   (2) 3 to 30% by weight of N-unsubstituted amides and/or N-alkylamides and/or N-hydroxyalkylamides and/or N-oxaalkylamides of acrylic and/or methacrylic acid;
   (3) 40 to 94% by weight of alkyl esters of acrylic acid and/or methacrylic acid having one to eight carbon atoms in the alkyl radical and/or styrene and/or alkyl vinylbenzenes having one to three carbon atoms in the alkyl radical;
   (4) 0 to 30% by weight of other copolymerizable ethylenically unsaturated monomers.

References Cited

UNITED STATES PATENTS

| | | | |
|---|---|---|---|
| 2,206,090 | 7/1940 | Haggenmacher | 204—181 |
| 2,345,543 | 3/1944 | Wohnsiedler et al. | 204—181 |
| 2,728,751 | 12/1955 | Catlin et al. | 260—80.73 |
| 2,811,494 | 10/1957 | Smith et al. | 260—80.73 |
| 3,037,955 | 6/1962 | Carman | 260—80.73 |
| 3,048,501 | 7/1962 | Miller et al. | 260—80.73 |
| 3,159,558 | 12/1964 | McCoy | 204—181 |
| 3,230,162 | 1/1966 | Gilchrist | 204—181 |
| 3,262,917 | 7/1966 | Maeder | 260—80.73 |
| 3,287,305 | 11/1966 | Maeder | 260—80.73 |
| 3,378,477 | 4/1968 | Gentles et al. | 204—181 |

OTHER REFERENCES

Fink et al., "Electrodeposition and Electrochemistry of the Deposition of Synthetic Resins" in Transactions of the Electrochemical Society, vol. 94, 1948, TP 250 A 54, 204–181, pp. 325–326.

JOHN H. MACK, Primary Examiner

E. ZAGARELLA, JR., Assistant Examiner

UNITED STATES PATENT OFFICE
CERTIFICATE OF CORRECTION

Patent No. 3,455,806                                          July 15, 1969

Herbert Spoor et al.

It is certified that error appears in the above identified patent and that said Letters Patent are hereby corrected as shown below:

Column 2, line 47, "praticularly" should read -- particularly --.
Column 5, line 56, "95%" should read -- 94% --.

Signed and sealed this 28th day of April 1970.

(SEAL)
Attest:

Edward M. Fletcher, Jr.                   WILLIAM E. SCHUYLER, JR.
Attesting Officer                                    Commissioner of Patents